United States Patent
Kadtke et al.

(10) Patent No.: US 6,564,176 B2
(45) Date of Patent: May 13, 2003

(54) SIGNAL AND PATTERN DETECTION OR CLASSIFICATION BY ESTIMATION OF CONTINUOUS DYNAMICAL MODELS

(75) Inventors: James B. Kadtke, La Jolla, CA (US); Michael N. Kremliovsky, San Diego, CA (US)

(73) Assignee: Nonlinear Solutions, Inc., Stafford, VA (US)

(*) Notice: Subject to any disclaimer, the term of this patent is extended or adjusted under 35 U.S.C. 154(b) by 0 days.

(21) Appl. No.: 09/932,450

(22) Filed: Aug. 17, 2001

(65) Prior Publication Data

US 2002/0133317 A1 Sep. 19, 2002

Related U.S. Application Data

(63) Continuation of application No. 09/105,529, filed on Jun. 26, 1998, now Pat. No. 6,278,961.
(60) Provisional application No. 60/051,579, filed on Jul. 2, 1997.

(51) Int. Cl.[7] .............................................. G06F 15/00
(52) U.S. Cl. .................................... 702/189; 703/2
(58) Field of Search ................................ 702/189, 196; 703/2; 704/243; 700/52

(56) References Cited

U.S. PATENT DOCUMENTS

| | | | | |
|---|---|---|---|---|
| 5,453,940 A | * | 9/1995 | Broomhead et al. | 702/109 |
| 5,493,516 A | * | 2/1996 | Broomhead et al. | 700/29 |
| 5,617,513 A | * | 4/1997 | Schnitta | 706/14 |
| 5,835,682 A | * | 11/1998 | Broomhead et al. | 706/14 |
| 6,131,089 A | * | 10/2000 | Campbell et al. | 704/232 |
| 6,181,976 B1 | * | 1/2001 | Chandler | 700/42 |
| 6,192,353 B1 | * | 2/2001 | Assaleh et al. | 704/230 |
| 6,240,282 B1 | * | 5/2001 | Kleider et al. | 375/285 |
| 6,278,961 B1 | * | 8/2001 | Kadtke et al. | 702/189 |
| 6,349,272 B1 | * | 2/2002 | Phillips | 703/14 |

OTHER PUBLICATIONS

Moreno et al.,"A Vector Taylor Series Approach for Environment–Independent Speech Recognition", IEEE, copyright 1995.*

Scott et al., "Nonlinear System Identification and Prediction Using Orthonormal Functions", IEEE, Jul. 1997.*

* cited by examiner

*Primary Examiner*—Patrick Assouad
(74) *Attorney, Agent, or Firm*—Robroy R. Fawcett

(57) ABSTRACT

A signal detection and classification technique that provides robust decision criteria for a wide range of parameters and signals strongly in the presence of noise and interfering signals. The techniques uses dynamical filters and classifiers optimized for a particular category of signals of interest. The dynamical filters and classifiers can be implemented using models based on delayed differential equations.

11 Claims, 2 Drawing Sheets

Principal processing chain.

Figure 1: Principal processing chain.
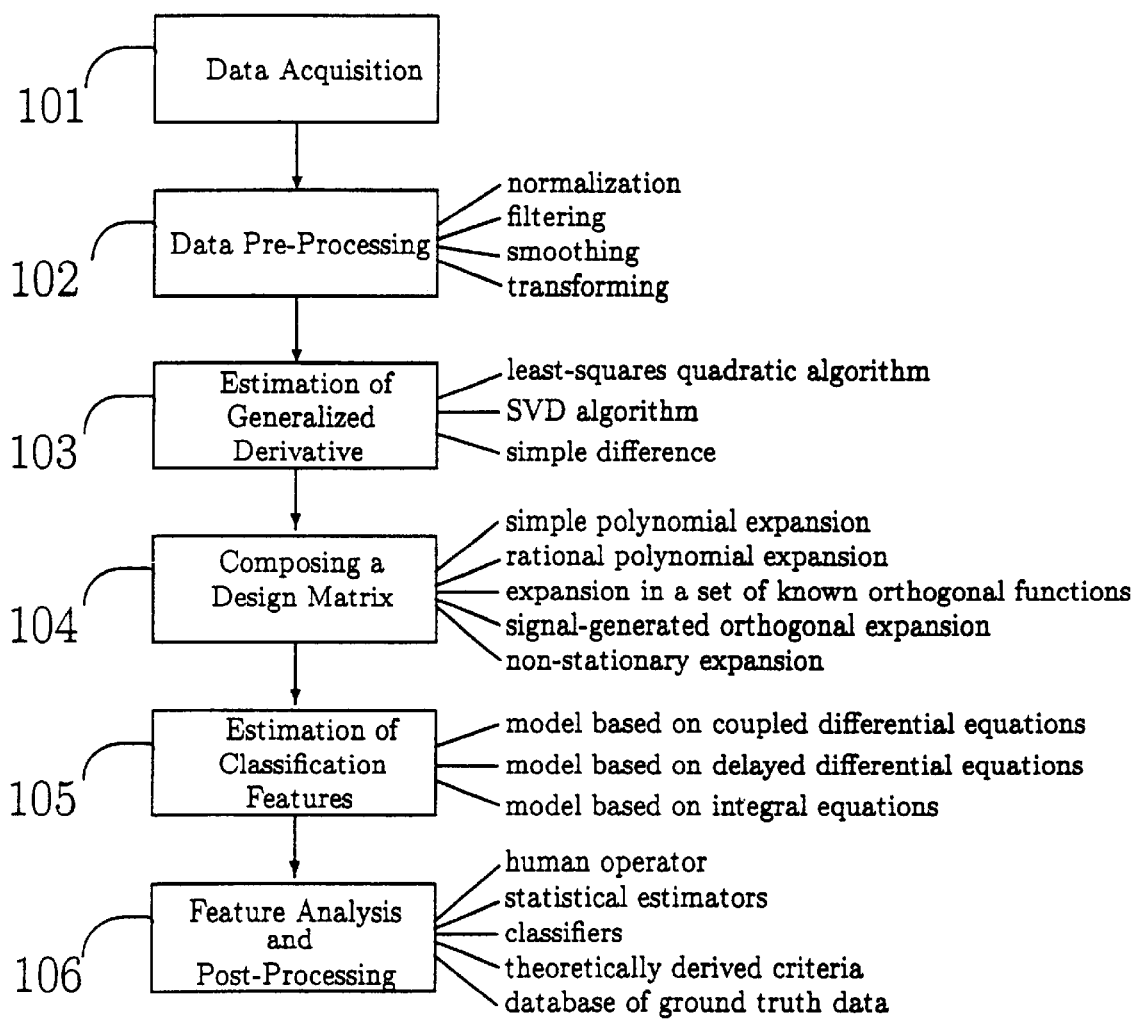

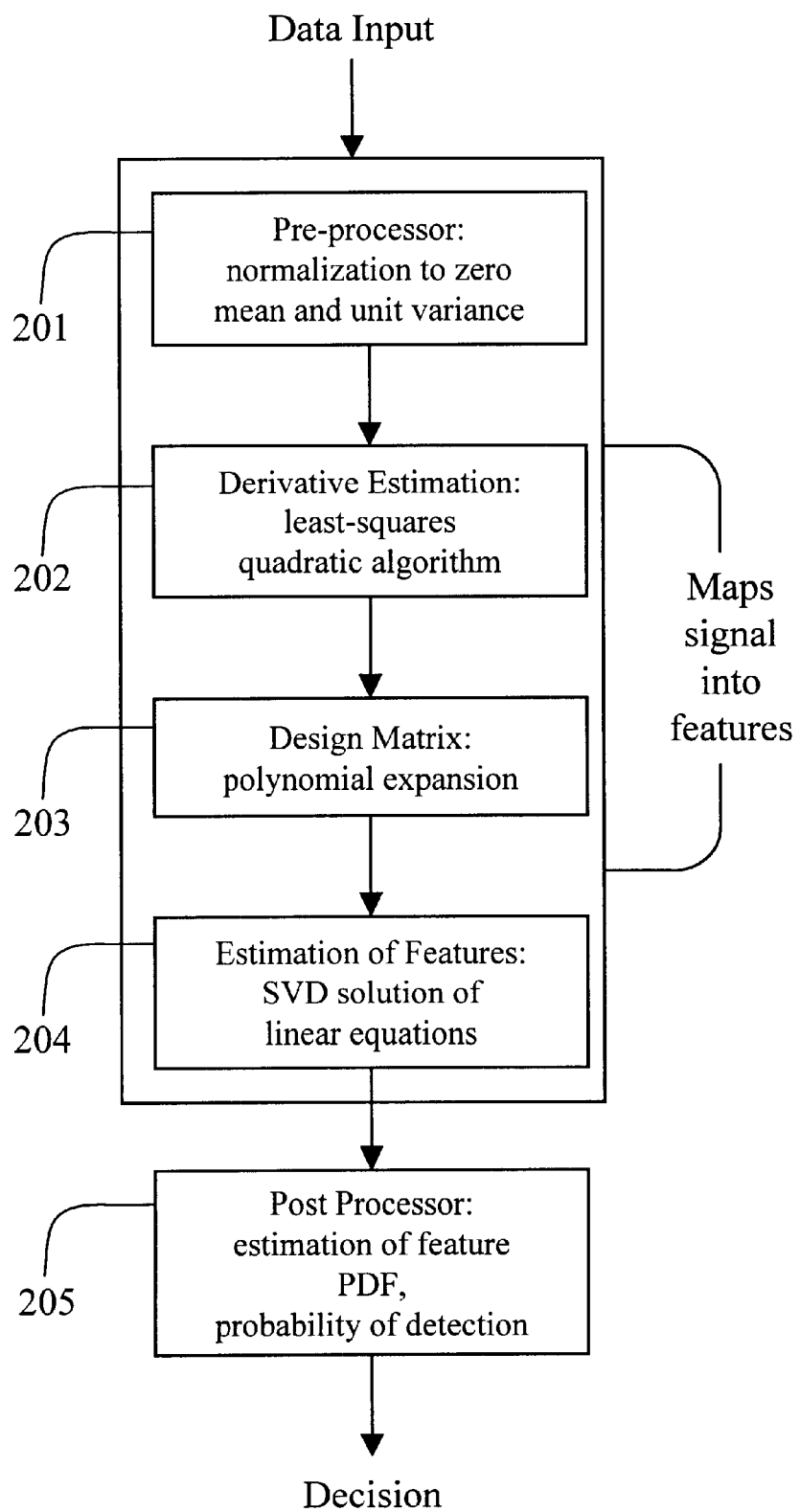
Figure 2: Principal processing chain in the first embodiment of the invention: "General Purpose Detector of Deterministic Signals"

SIGNAL AND PATTERN DETECTION OR CLASSIFICATION BY ESTIMATION OF CONTINUOUS DYNAMICAL MODELS

This application is a continuation of U.S. application Ser. No. 09/105,529, filed Jun. 26, 1998, now U.S. Pat. No. 6,278,961, which claims the benefit of U.S. Provisional Application No. 60/051,579, filed Jul. 2, 1997.

The U.S. Government has a paid-up license in this invention and the right in limited circumstances to require the patent owner to license others on reasonable terms as provided for by the terms of contract No. N00421-97-C-1048 awarded by the United States Navy.

BACKGROUND

1. Field of Invention

This invention relates to signal processing and pattern recognition, specifically to a new way of characterization of data as being generated by dynamical systems evolving in time and space.

2. Discussion of Prior Art

Our invention is based on novel ideas in signal processing derived by us from the theory of dynamical systems. This field is relatively new, and we specifically have developed our own theoretical framework which makes our approach unique. While we do not include the full theory here, it gives our invention a solid analytical foundation.

The theory of dynamically-based detection and classification is still under active the oretical development. The main idea of our approach is to classify signals according to their dynamics of evolution instead of particular data realizations (signal measurements). Our method opens the possibility of a very compact and robust classification of signals of deterministic origin.

Modeling of dynamical systems by ordinary differential equations and discrete maps reconstructed from data has been proposed by several researchers, and their results have been published in open scientific journals (for example, J. P. Crutchfield and B. S. McNamara, Complex Systems 1(3), p.417 [8]). Modeling can generally be performed on low-noise data when very accurate dynamical models can be found to fit the data. This may be considered a prior art, though in the current invention we do not use parametric dynamical systems to model data, rather we use them for detection and classification-of signals. Correspondingly, in the high noise case, our model equations need not necessarily be exact, since we do not try to use the estimated equations to predict the data. This makes an important difference between modeling approaches proposed in the prior art and our detection/classification framework: while model selection is subject to numerous restrictions, our algorithmic chain can always be implemented, regardless of the source of the signal. Currently, no practical devices or patents exist using this technology.

Note: in all references throughout this document, we use the term "signals" to mean the more general category of "time series, signals, or images".

OBJECTS AND ADVANTAGES

Accordingly, several objects and advantages of our invention are:

1. to provide a theoretically well-founded method of signal processing and time series analysis which can be used in a variety of applications (such as Sonar, Radar, Lidar, seismic, acoustic, electromagnetic and optic data analysis) where deterministic signals are desired to be detected and classified;
2. to provide possibilities for both software-based and hardware-based implementations;
3. to provide compatibility of our device with conventional statistical and spectral processing means best-suited for a particular application;
4. to provide amplitude independent detection and classification for stationary, quasi-stationary and non-stationary (transient) signals;
5. to provide detection and classification of signals where conventional techniques based on amplitude, power-spectrum, covariance and linear regression analyses perform poorly;
6. to provide recognition of physical systems represented by scalar observables as well as multi-variate measurements, even if the signals were nonlinearly transformed and distorted during propagation from a generator to a detector;
7. to provide multi-dimensional feature distributions in a correspondingly multi-dimensional classification space, where each component (dimension) corresponds to certain linear or nonlinear signal characteristics, and all components together characterize the underlying state space topology for a dynamical representation of a signal class under consideration;
8. to provide robust decision criteria for a wide range of parameters and signals strongly corrupted by noise;
9. to provide real-time processing capabilities where our invention can be used as a part of field equipment, with on-board or remote detectors operating in evolving environments;
10. to provide operational user environments both under human control and as a part of semi-automated and fully-autonomous devices;
11. to provide methods for the design of dynamical filters and classifiers optimized to a particular category of signals of interest;
12. to provide a variety of different algorithmic implementations, which can be used separately or be combined depending on the type of application and expected signal characteristics;
13. to provide learning rules, whereby our device can be used to build and modify a database of features, which can be subsequently utilized to classify signals based on previously processed patterns;
14. to provide compression of original data to a set of model parameters (features), while retaining essential information on the topological structure of the signal of interest; in our typical parameter regimes this can provide enormous compression ratios on the order of 100:1 or better.

Further objects and advantages of our invention will become apparent from a consideration of the flowcharts and the ensuing description.

DESCRIPTION OF FLOWCHARTS

The objects and advantages of the invention will be understood by reading the following detailed description in conjunction with the drawings in which:

FIG. 1 is a block diagram of the principal algorithm for signal and pattern detection and classification by estimation continuous dynamical models. Each block is given several implementations and algorithmic details are explained in the corresponding text of the Description.

FIG. 2 is a-block diagram of the first embodiment. The difference between this embodiment and the general processing chain shown in FIG. 1 is that a preferable implementation is indicated for each step in the processing chain. Detection/classification decisions are made upon post-processing of feature distributions.

DESCRIPTION OF INVENTION

The theory of Detection/Classification by Estimation of Continuous Dynamical Models is under active development by us. There are strong results clearly indicating expected theoretical performance on simulated and real-world data sets from the detectors/classifiers built as embodiments of our invention.

Though the general processing chain described by FIG. 1 and FIG. 2 gives the full disclosure of our invention, we must stress here that several components can be implemented in a variety of ways. By building different embodiments of our invention, one can design software and hardware based devices which are best suited for a particular application.

The following are examples of implementations for each corresponding component in the processing scheme:

Data acquisition (FIG. 1, block 101). Can be performed by means of
  A-1 data digitized while recording from single or multiple sensors, including: acoustic, optical, electromagnetic, seismic sensors but not restricted to this set;
  A-2 data retrieved from a storage device such as optical or magnetic disks, tapes and other types of permanent or reusable memories;
  A-3 data generated and/or piped by another algorithm, code, driver, controller, signal processing board and so on;
  As a result of this step we assume that either a set of digitized scalar or vector data is obtained and this data set may contain information to be detected, classified, recognized, modeled, or to be used as a learning set. The data consists of, or is transformed to, a set of ordered numbers $x_i$, where the index i=1, 2 . . . , L can indicate time, position in space, or any other independent variable along which data evolution occurs. We will also refer to $x_i$ as a "signal-of-interest" (or simply, a signal), "observations" or "measurements".

Data preprocessing (FIG. 1, block 102). Can be performed by means of
  B-1 normalizing the data;
  B-2 filtering the data;
  B-3 smoothing the data;
  B-4 continuously transforming the data.
  It is convenient, but not necessary, to organize data in a $D \times L_{eff}$ data matrix X, where the rows are D-dimensional observations (an independent variable is indexed from 1 to $L_{eff}=L$)

$$X = \begin{pmatrix} x_1(1) & x_2(1) & \cdots & x_D(1) \\ x_1(2) & x_2(2) & \cdots & x_D(2) \\ \cdots & \cdots & \cdots & \cdots \\ x_1(L_{eff}) & x_2(L_{eff}) & \cdots & x_D(L_{eff}) \end{pmatrix} \quad (1)$$

or D delayed coordinates in the case of a single scalar observation $$X = \begin{pmatrix} x(1+(D-1)\tau) & x(1+(D-2)\tau) & \cdots & x(1) \\ x(2+(D-1)\tau) & x(2+(D-2)\tau) & \cdots & x(2) \\ \cdots & \cdots & \cdots & \cdots \\ x(L_{eff}+(D-1)\tau) & x(L_{eff}+(D-2)\tau) & \cdots & x(L_{eff}) \end{pmatrix} \quad (2)$$

In the latter case we must introduce the delay parameter $\tau$ and use the reduced data length $L_{eff}=L-(D-1)\tau$, while in the former case $L_{eff}=L$.

In the language of dynamical systems theory the data matrix is a trajectory of the system in the D-dimensional state space.

In a semi-autonomous or fully autonomous mode of operation this step can be used to estimate parameters $\tau$, D and P (if required) automatically. If the origin of the signal or performance improvement goals do not dictate a particular preference, these default values can be used: $\tau$ corresponds to a first minimum or a first zero (whichever is less) of the autocorrelation function of the signal, and D=3, P=2. Also important is the signal-to-noise ratio (SNR) defined as:

$$SNR = 10 \cdot \log_{10} \frac{\text{signal variance}}{\text{noise variance}}, \quad (3)$$

and is measured in decibels (dB).

Estimation of generalized derivative (FIG. 1, block 103). The primary difference between our invention and a variety of devices based on regression schemes, as well as linear modeling techniques (ARMA models), is that we determine a relationship between the data and its rate of evolution expressed by the signal derivative. This provides us with a dynamical modeling framework. We further generalize this and propose that robust results can be obtained even for scalar signals generated by a multi-dimensional system, and for signals which were nonlinearly transformed on their way from the generator to the detector. Therefore, one can estimate the derivative (rate of signal evolution) in many ways depending upon desired output and signal properties. Here are several alternative algorithms which can be optionally used:

C-1 least-squares quadratic algorithm with smoothing; this estimator has proved to be extremely robust for very noisy signals (even with less than −20 dB signal-to-noise ratios) and for non-stationary signals; the formula is:

$$B(i) = \frac{3}{d(d+1)(2d+1)\Delta t} \sum_{j=-d}^{j=i+d} x(i+j) \cdot j, \quad (4)$$

where (2d+1) is the number of points taken for the estimation, $\Delta t$ is the time (or length, if the derivative is spatial) between samples;

C-2 higher-order estimators (for example, cubic algorithms) and algorithms minimizing products different from quadratic (for example, a sum of absolute values of differences between the signal derivative and its estimate); most of these techniques are less robust than C-1 in the presence of significant noise, however, they can be used if a particular application suggests it;

C-3 estimation from a singular value decomposition of the data matrix X (Broomhead, D. S.; King, G. P. Physica D, 2OD (2–3), p.217 [2]); this yields a globally-smoothed derivative, which is suitable for stationary signals corrupted by weak noise (>10 dB);

C-4 simple difference ("right" and "left", correspondingly):

$$B(i) = \frac{1}{\Delta t} \cdot (x(i+1) - x(i)) \text{ or } B(i) = \frac{1}{\Delta t} \cdot (x(i) - x(i-1)); \quad (5)$$

this estimator is sensitive to even small amounts of noise; such sensitivity can be useful for detecting weak noise in a smooth background of low-dimensional deterministic signal.

For any given processing chain we assume one algorithm should be used to generate output. This does not restrict a potential designer from using different algorithms in parallel, and to implement conditional probabilities and complex decision making schemes in a post-processing unit (see below). In the following description we will refer to derivative scheme C-1. As a result of this step a derivative vector B (in the case of scalar measurements) or a set of derivative vectors $\{B_1, B_2, \ldots, BD\}$ (in the case of multi-variate measurements) is estimated. The length $L_w$ of the derivative vector is the same as the number of points in the data sample, reduced by the number of points needed to estimate the derivative at the first and the last points.

Composing a design matrix (FIG. 1, block 104). In general, the design matrix (see, for example, "Numerical Recipes in C" by W. H. Press et. al., Cambridge University Press, 1992, page 671) has its column elements which are algebraically constructed from data values. Different rows represent different instances of observation (signal measurements). The rule used to compose column elements is called expansion. By changing expansions one can control the type of model for data analysis. There is an infinite number of ways a particular expansion can be composed, but there are only a few general types:

D-1 Simple polynomial expansion (Taylor expansion). This is the most general local representation of the flow. We recommend it as a model for unknown signals or in the cases when many signals of different origin are processed.

D-2 Rational polynomial expansion, being a ratio of two polynomial expansions.

D-3 Expansion using a set of specific known orthogonal functions. This can be used if there is reason to believe that signals-of-interest may have a certain state space topology or spectral properties.

D-4 Expansion in a set of empirical orthogonal functions obtained from a data matrix by orthogonalization (like singular value decomposition, or a Gram-Schmidt procedure). This expansion has features unique to a particular observed class of signals.

D-5 Any of the above mentioned expansions, additionally including terms containing the independent variables (for example, time or coordinate). This type of expansion can be used to process non-stationary signals.

The same notion as for derivative calculation applies here: for any given processing chain the same expansion should be used to compare all outputs. In the following description we will refer to Expansion D-1 except where indicated. The polynomial expansion (for delayed variables we put: $x_1(i) = (i+(D-1))$, ..., $x_D(i) = x(i)$)

$$a_0 + a_1 x_1(i) + a_2 x_2(i) + \ldots + a_D x_D(i) + a_{D+1} x_1^2(i) + \quad (6)$$
$$a_{D+2} x_1(i) x_2(i) + \ldots + a_k x_1(i) x_D(i) + a_{k+1} x_2^2(i) +$$
$$a_{k+2} x_2(i) x_3(i) + \ldots + a_{N-1} x_{D-1}^{P-1}(i) x_D(i) + a_N x_D^P(i)$$

is characterized by order P and dimension D, and has $N=(D+P)!/(D!P!)$ terms. The unknown coefficients $\{a_0, a_1, \ldots, a_N\}$ in the expansion are classification features which must be estimated as follows: first the $N \times L_w$ design matrix F is composed ($L_w > N$). For example, in the case of 2-dimensional (D=2) second order (P=2) polynomial expansions:

$$F = \begin{pmatrix} 1 & x_1(1) & x_2(1) & x_1^2(1) & x_1(1)x_2(1) & x_2^2(1) \\ 1 & x_1(2) & x_2(2) & x_1^2(2) & x_1(2)x_2(2) & x_2^2(2) \\ \ldots & \ldots & \ldots & \ldots & \ldots & \ldots \\ 1 & x_1(L_w) & x_2(L_w) & x_1^2(L_w) & x_1(L_w)x_2(L_w) & x_2^2(L_w) \end{pmatrix} \quad (7)$$

For a particular application, choosing a particular model is still an art. Preferably, selection is based on physical properties of the system(s) generating the signal(s) under consideration. For example, to analyze short acoustic pulses we can choose a non-stationary quasi-linear waveform described by the equations:

$$dx_1/dt = a_1 x_1 + a_2 t x_1 + a_3 x_2 \quad (8)$$
$$dx_2/dt = a_1 x_2 + a_2 t x_2 - a_3 x_1$$

where $a_1$ and $a_2$ are proportional to the inverse width of the pulse and $a_3$ indicates characteristic frequency.

Also, note that to compose the design matrix we do not need the results from the previous step.

Estimation of classification features (FIG. 1, block 105). Our classification features, being the coefficients in the model expansion, must be estimated from the equations connecting the derivative (rate of evolution) with the design matrix. There are three general types of relations for the case of one independent variable. We describe each case separately, since implementations and output depend on the model type used. Nevertheless, all approaches address the same task—to estimate a vector of features $A = \{a_0, a_1, \ldots\}$ which provides the best fit to the derivative B by the product $F \cdot A$.

E-1 Model based on a system of D coupled ordinary differential equations for vector observations. In this case we have an explicit model consisting of D equations for D-dimensional measurements: $B_k = F \cdot A_k$, $k = 1, \ldots, D$. Correspondingly, we estimate the derivative for each component of the vector observation and solve D equations for D N-dimensional feature vectors $A_k$.

E-2 Model based on a delayed differential equation. This is the most common case when the observation is a scalar variable, and the data matrix X and the design matrix F are composed from the delayed coordinates as explained by (7). In this case the rows of the matrix equation $B = F \cdot A$ become a differential equation with (D−1) delays taken at instants $i = 1, \ldots, L_w$. This is the most computationally efficient scheme, at least for cases when an analytic solution cannot be derived.

E-3 Model based on an integral equation. This case is similar to E-2, but before actual feature estimation, left and right sides of the equation B=FA are integrated (summed in the discrete case) over intervals l=1, . . . , $L_w$.

All preliminary steps are now complete at this point, and we can estimate features by solving approximately an over-determined system of linear equations B=F·A (N variables, $L_w$ equations). In the most general design, this can be done using a singular value decomposition (for example, see the algorithm in the book "Numerical Recipes in C" by W. H. Press et. al., Cambridge University Press, 1992, page 65). The solution can be expressed as A=V·diag(1/$w_j$)·UT·B, where F=U·diag($w_j$)·$V^T$ is the decomposition of the design matrix F into an $L_w$×N column-orthonormal matrix U, N×N diagonal matrix diag($w_j$) with j=1, . . . , N positive or zero elements (singular values), and the transpose of an N×N orthogonal matrix V. Such a decomposition is known to provide a very robust solution of the least-square problem for over-determined systems of linear equations. Potential singularities in the matrix equations can be eliminated by setting corresponding singular values to zero. Also, note that there are many other possibilities for solving an over-determined system of linear equations in a least-square sense, or by minimizing some other difference functionals. Therefore, the solution by singular value decomposition should not be construed as a limitation on the scope of this invention. For example, for Cases D-3 and D-4 (when orthogonal expansions are used) the solution is provided simply by the following product:

$$A=F \cdot B \quad (9)$$

where the row elements (j=1, . . . , N) of the design matrix F are in this case the basic orthogonal functions $\phi_j(x_1, x_2, \ldots, x_D)$ divided by the normalization factor $E_{i=1}^{L_w} \phi_j^2(x_1(i), \ldots, x_D(i))$. The latter approach may be preferable in a real-time operation where estimation of features must be provided rapidly. As a result of this step, a sample of data consisting of $L_w$ vector or scalar measurements is mapped into N<<$L_w$ features, which are coefficients of the equations describing the dynamics of the data. If we slide the observation window along the data, we obtain an ensemble of feature vectors $A_i$, i=1, . . . , $N_w$, where $N_w$, is the number of windows. In the ideal case of a long ($L_w \to \infty$) noise-free observation and a valid model, the distributions asymptotically approach delta-functions. Correspondingly, short data samples, non-stationarity, noise, and sub-optimal expansions will spread out the distributions, which then contain information about these effects.

Feature analysis and post-processing (FIG. 1, block 106). Starting from this step in algorithm there are a variety of ways to utilize the estimated feature distributions, depending on the particular task or application. Because our device is based on a very novel use of the general theory of spatio-temporal evolution of dynamical systems, we cannot possibly foresee all applications and benefits of our invention. Here, we mention a few implementations which were designed by us during testing on simulated and real-world data. More specific implementations are also given below, where we describe how several embodiments of our invention operate. The post-processing of feature distributions can be performed:

F-1 by a human operator observing feature distributions on a computer display, printer, or any other device capable of visualizing the feature distributions or their numerical values;

F-2 by using statistical estimators summarizing properties of the feature distributions such as statistical distance and Mean Discrimination Statistic (MDS) and its fractional moments (see Section "Operation of Invention" below, where General Purpose Classifier is described);

F-3 by using classifiers such known in the art as that based on Mahalanobis distances (for example, Ray, S., and Turner, L. F. Information Sciences 60, p.217) [4], Samrnon's mapping (for example, Dzwinel, W. Pattern Recognition 27(7), p.949 [5]), neural nets (for example, Streit, R. L.; Luginbuhl T. E. IEEE Transactions on Neural Networks 5(5), 1994, p.764. [3]) and so on;

F-4 by building threshold detectors in feature space based on standard signal processing schemes, for example, the Neyman-Pearson criterion;

F-5 by comparing theoretically-derived feature distributions (for example, for normally distributed noise) with those estimated from data;

F-6 by utilizing distributions of features previously estimated from ground truth data, and stored in a database.

In almost all cases several statistical parameters are very useful for characterization of the feature distributions $\{A_i\{a_1, a_2, \ldots, a_N\}_i | i=1 \ldots N_w\}$. They are:

1. weighted means (centers of distributions):

$$\langle a_j \rangle = \frac{1}{N_w} \sum_{i=1}^{N_w} \gamma_k a_{ji}, \quad (10)$$

where $E\gamma_k=n_w$ are weights which can suppress outliers;

2. variances (standard deviations, spread of the distributions):

$$\sigma_{a_j}^2 = \frac{1}{N_w} \sum_{i=1}^{N_w} (a_{ji} - \langle a_j \rangle)^2; \quad (11)$$

3. significance: $S_j = \langle a_j \rangle / \sigma_{aj}$;

4. histograms (discrete estimate of the probability density functions): $H(a_j)$.

Histograms are the most widely used density estimator. The discontinuity of histograms can cause extreme difficulty if derivatives of the estimates are required. Therefore, in most applications a better estimator (such as kernel density estimators) should be chosen.

Though the above provides some options for data analyses and algorithm design, several preferred embodiments of the invention will be specifically addressed below through the description of their operation.

OPERATION OF INVENTION

Generally, the operational mode of the algorithm depends on the embodiment of the invention. In any particular implementation, several control parameters in addition to those described above can be introduced. Given unconstrained time and computational power, many processing schemes can be incorporated into a single device. However, it is usually not necessary to provide such universality, since almost all advantages of the scheme can be gained based on a specialized embodiment of our invention best suited for a specific application. Therefore, we include below a description of several typical processing devices specifically optimized for preferred tasks.

General Purpose Detector of Deterministic Signals

From a theoretical study of dynamical modeling, we have derived the properties of feature distributions when the input signal X consists of Gaussian noise or sinusoidal waves. These distributions can be obtained with arbitrary accuracy analytically and also numerically on simulated data sets.

The purpose of this embodiment is to estimate a probability for the given observation to belong to either a purely random process, or to a process different from this, i.e. containing a deterministic component. We will assume that a probability density functions $P_0(a_j, L_w)$, being the PDF, for the specified class of signals was preliminarily calculated using theoretical reasoning; or estimated from long simulated (or measured) data sets normalized to zero mean and unit variance. Normalization is not mandatory, but is a convenient way to exclude amplitude variations. As we indicated, the PDF depends on window length, thus a scaling relation should also be derived.

The detector is built using the following components:
1. Pre-processor normalizing data to zero mean and unit variance (FIG. 2, block 201).
2. Derivative estimated using least-squares quadratic algorithm (FIG. 2, block 202).
3. Polynomial expansion (D=2, P=2) used in conjunction with the model based on delayed differential equation (FIG. 2, block 203).
4. The system of linear algebraic equations is solved using SVD algorithm as described above (FIG. 2, block 204).
5. Estimated probabilities are calculated using model probability densities $P(a_j)$, where $a_j$, j=1, . . . , 6 are estimated coefficients (FIG. 2, block 205).

One modification of this device can greatly improve performance statistics. If many observations (windows) of the signal-of-interest are available prior to the actual detection task, we can approximate the PDF from its feature distributions $P_1(a_j, L_w)$ using functional fits. There are several ways to estimate PDF from discrete sets known in the prior art. For example, kernel density estimation is described in details in the book "Density Estimation For Statistical and Data Analysis" by B. W. Silverman [6]. The details are beyond the scope of this invention.

Once the $P_1(a_j, L_w)$ is estimated one can use a Neyman-Pearson criterion and build a threshold detector (for example, see in the book "detection of Signals in Noise" by R. McDonough and A. Whalen, Academic Press, 1995 [7]). Using a "Probability of Detection", "Probability of False Alarm" framework ($P_d$, $P_{fa}$), the desired $P_{fa}$ is chosen and the threshold $a_{th}$ is estimated from the following relation (the integral should be substituted by sum in the discrete case):

$$P_{fa} = \int_{a_{th}}^{\infty} P_0(a')da'. \tag{12}$$

Now, if a new sample is observed with a <ath and we know that it belongs either to $P_0(a)$ ("noise") or $P_1(a)$ ("signal"), then the probability of detection of the signal is $$P_d = \int_{a_{th}}^{\infty} P_1(a')da', \tag{13}$$

while $P_{fa}$ is not higher than chosen.

Multi-variate threshold detectors can also be built using several features by implementing either a joint probability framework or simply numerically estimating $P_d$ by counting events of correct and false detection, during preliminary training in a controlled experimental environment.

General Purpose Classifier

Suppose that the task is to classify $N_s$ signals from $N_c$ known distinct classes. We assume that coefficients $\{a_j | j=1 \ldots N\}$ are estimated using one of the previously described algorithms. Here, we describe the post-processing unit for general classification.

It is convenient to define several classification measures in feature space. The Euclidean distance between two feature distribution centers $\langle a_k^{(1)} \rangle$ and $\langle a_k^{(2)} \rangle$ is:

$$r_{12} = \sqrt{\sum_{k=1}^{N} (\langle a_k^{(1)} \rangle - \langle a_k^{(2)} \rangle)^2}. \tag{14}$$

This distance cannot be directly used as a measure of separation between distributions, because it does not include statistical information about how strongly the distributions overlap. Instead, we define the Statistical Distance as a normalized, dimensionless distance between feature distributions ($\{a_k^{(1)}\}$ and $\{a_k(2)\}$):

$$R_{12} = r_{12}/\sigma_{E12}, \tag{15}$$

where $\sigma_E$ is a projected total standard deviation:

$$\sigma_{\Sigma 12} = \frac{1}{r_{12}} \sum_{k=1}^{N} (\sigma_k^{(1)} + \sigma_k^{(2)}) |\langle a_k^{(1)} \rangle - \langle a_k^{(2)} \rangle|. \tag{16}$$

Obviously, $R_{ij} = R_{ji}$, so we have only $N_c(N_c-1)/2$ different numbers. This statistical distance now expresses the distribution separation in terms of mean standard deviations. Further, we define the Mean Discrimination Statistic (MDS) to be the arithmetic average of all pairwise statistical distances between all distributions:

$$MDS \equiv \frac{2}{N_c(N_c-1)} \sum_{i=1}^{N_c} \sum_{j>i}^{j=N_c} R_{ij}, \tag{17}$$

where $N_c$ is the number of distributions (possible classes). It is also useful to define fractional "moments" of the MDS:

$$MDS(1/n) = \left( \frac{2}{N_c(N_c-1)} \sum_{i=1}^{N_c} \sum_{j>i}^{j=N_c} R_{ij}^{1/n} \right)^n \tag{18}$$

If all class distributions are equally separated in a particular feature space, then MDS(1)=MDS(1/2). In an opposite case, when all but one class distribution form a dense cluster, while one class distribution is very remote, then MDS(1)>MDS(1/2). Hence, the MDS can be used as a design criteria in choosing the classifier model parameters.

Note that pairwise classification is based on $R_{12}$ distances, which can be translated into detection probabilities according to the statistical scheme appropriate for a particular application. For example, it can be the Neyman-Pearson criterion described above.

It is convenient to format decision output as a table of pairwise statistical distances $R_{ij}$. For example, for 3 signals:

|          | signal 1 | signal 2 | signal 3 |
|----------|----------|----------|----------|
| signal 1 | 0        | $R_{12}$ | $R_{13}$ |
| signal 2 | $R_{12}$ | 0        | $R_{23}$ |
| signal 3 | $R_{13}$ | $R_{23}$ | 0        |

If the number $R_{ij}$ is greater than a certain threshold (we often use 1 as a criterion of good separation), then distributions of features from signals i and j can be considered to be well discriminated.

6.3 Time-Evolving Image Classifier

One important potential application of our invention can be the classification of evolving patterns (images) generated by a spatio-temporal dynamical system. This embodiment describes how to modify the processing chain to include 2D image processing (for higher dimensional "images" the generalization is straightforward). This modification basically involves the design matrix only, namely the way the expansion in spatial indices is constructed. We assume that the data in this embodiment is represented by a 2D matrix evolving in time: $\{X(t)|i=1 \ldots L_1, j=1 \ldots L_2\}$. Correspondingly we have a two-component derivative which we will call $B_1$ and $B_2$. The geometry of the 2D image under consideration is not necessarily Euclidean, thus "1" and "2" are not necessarily "x" and "y", but can be "distance" and "angle" in polar coordinates, for example. We will assume in the following description that the image has Euclidean geometry, but this should not restrict application to patterns measured in different coordinate systems.

In general, the expansion can include more than the nearest-neighbor points, and can even be non-local, but we will consider it here to be local and to include a single delay parameter for the sake of clarity:

$$F(X) = a_0 + a_1 x_{i,j}(t) + a_2 x_{i,j}(t-\tau) + a_3 x_{i-1,j}(t) + \qquad (19)$$
$$a_4 x_{i-1,j}(t-\tau) + a_5 x_{i+1,j}(t) + a_6 x_{i+1,j}(t-\tau) +$$
$$a_7 x_{i,j-1}(t) + a_8 x_{i,j-1}(t-\tau) + a_9 x_{i,j+1}(t) +$$
$$a_{10} x_{i,j+1}(t-\tau) + a_{11} x_{i,j}^2(t) + a_{12} x_{i,j}(t) x_{i,j}(t-\tau) + \ldots$$

This is a much longer expansion than the simple polynomial one for scalar signals (see D-1 definition in the description of the general processing chain). For P=2 and a single delay it includes 28 monomials. Also, note that such expansion takes into account spatial derivatives up to the second order only.

Two equations result from the projections on x and y directions:

$$B_1 = F_1(X) \qquad (20)$$
$$B_2 = F_2(X)$$

Therefore, the total number of features is 2×28=56. We recommend to reduce the number of terms-using symmetry considerations and physical reasoning appropriate for a given application. Our experience shows that most of the features will be non-significant, since an expansion like Eq. (19) is too general.

Post-processing of features and subsequent classification can be performed using any of the previously described techniques, but not restricted to them.

6.4 Non-stationary Signal Transformer

This embodiment of the invention simply maps a signal ($L_w$ numbers) into feature vectors (N numbers) using any of the specified above designs. Due to the fact that usually $L_w \ll N$ an enormous compression is achieved. If a sensor(s) is remotely located from the post-processing unit it allows for very economic data transfer. The window $L_w$ slides along the data with a window shift $L_s$ allowing for overlapping windows (if $L_s < L_w$).

This embodiment can also be considered as a functional part of any device built as embodiment of our invention. It simply incorporates blocks 102, 103, 104 and 105 shown in FIG. 1. For example, in the "General Purpose Detector of Deterministic Signals" (first embodiment) the blocks performing transformation are 201, 202, 203 and 204 grouped in FIG. 2.

Obviously, the transformation is applicable to non-stationary signals as well. This embodiment of the invention addresses possible changes in the signal under consideration reflected by the evolution of the features. By following feature trajectories in a feature space, one can study the changes in the signal pattern using highly compressed information about its dynamics. There are several potential applications of this embodiment, including: speech and voice recognition, bio-sonar characterization, motion detectors and so on.

REFERENCES

[1] Gouesbet, G., and Letellier, C. "Global Vector-Field Reconstruction By Using a Multivariate Polynomial L2 Approximation on Nets". Physical Review E 49(6), p.4955 (1994).

[2] Broomhead, D. S.; King, G. P. "Extracting Qualitative Dynamics From Experimental Data". Physica D, 20D (2–3), p.217 (1986).

[3] Streit, R. L.; Luginbuhl T. E. "Maximum Likelihood Training of Probabilistic Neural Networks". IEEE Transactions on Neural Networks 5(5), p.764 (1994).

[4] Ray, S.; Turner, L. F. "Mahalanobis Distance-Based Two New Feature Evaluation Criteria". Information Sciences 60, p.217 (1992).

[5] Dzwinel, W. "How To Make Sammon's Mapping Useful For Multidimensional Data Structures Analysis". Pattern Recognition 27(7), p.949.

[6] Silverman, B. W. "Density Estimate For Statistical and Data Analysis". Chapman and Hall, London—N.Y., 1986.

[7] McDonough, R., and Whalen, A. "Detection of Signals in Noise". Academic Press, 1995.

[8] Crutchfield, J. P.; McNamara, B. S. "Equations of motion from a data series". Complex Systems 1(3), p.417–52 (1987).

What is claimed is:

1. A method for detecting and classifying signals, comprising:
    acquiring a data signal from a dynamical system;
    pre-processing the data signal;
    estimating the preprocessed signal's derivative to generate a derivative vector;
    applying an expansion function to the derivative vector to generate estimated coefficients; and
    processing the estimated coefficients to classify the data signal.

2. A method for detecting and classifying signals as defined in claim 1, wherein pre-processing the data signal comprises normalizing the data signal.

3. A method for detecting and classifying signals as defined in claim 1, wherein pre-processing the data signal comprises filtering the data signal.

4. A method for detecting and classifying signals as defined in claim 1, wherein pre-processing the data signal comprises smoothing the data signal.

5. A method for detecting and classifying signals as defined in claim 1, wherein pre-processing the data signal comprises transforming the data signal.

6. A method for detecting and classifying signals as defined in claim 1, wherein processing the estimated coefficients comprises applying a density estimator to the estimated coefficients to classify the data signal.

7. A method for detecting and classifying signals, comprising:

acquiring a data signal from a dynamical system;

pre-processing the data signal;

estimating the preprocessed signal's derivative to generate a derivative vector; and applying an expansion function to the derivative vector to generate estimated coefficients by performing a polynomial expansion on the derivative vector to generate a design matrix, and decomposing the design matrix to generate a feature vector having the estimated coefficients.

8. A method for detecting and classifying signals as defined in claim 7, wherein the polynomial expansion is a simple polynomial expansion.

9. A method for detecting and classifying signals as defined in claim 7, wherein the polynomial expansion is a rational polynomial expansion comprising a ratio of two polynomial expansions.

10. A method for detecting and classifying signals, comprising:

acquiring a data signal from a dynamical system;

pre-processing the data signal;

estimating the preprocessed signal's derivative to generate a derivative vector; and applying an expansion function to the derivative vector to generate estimated coefficients by performing a orthogonal function expansion on the derivative vector to generate a design matrix, and decomposing the design matrix to generate a feature vector having the estimated coefficients.

11. A method for detecting and classifying signals, comprising:

acquiring a data signal from a dynamical system, wherein the data signal comprises at least one two-dimensional image;

pre-processing the data signal;

estimating the preprocessed signal's derivative to generate a derivative vector; and applying an expansion function to the derivative vector to generate estimated coefficients.

* * * * *